THOMAS W. PARSONS
DONALD R. SIMON
INVENTORS

BY
ATTORNEYS

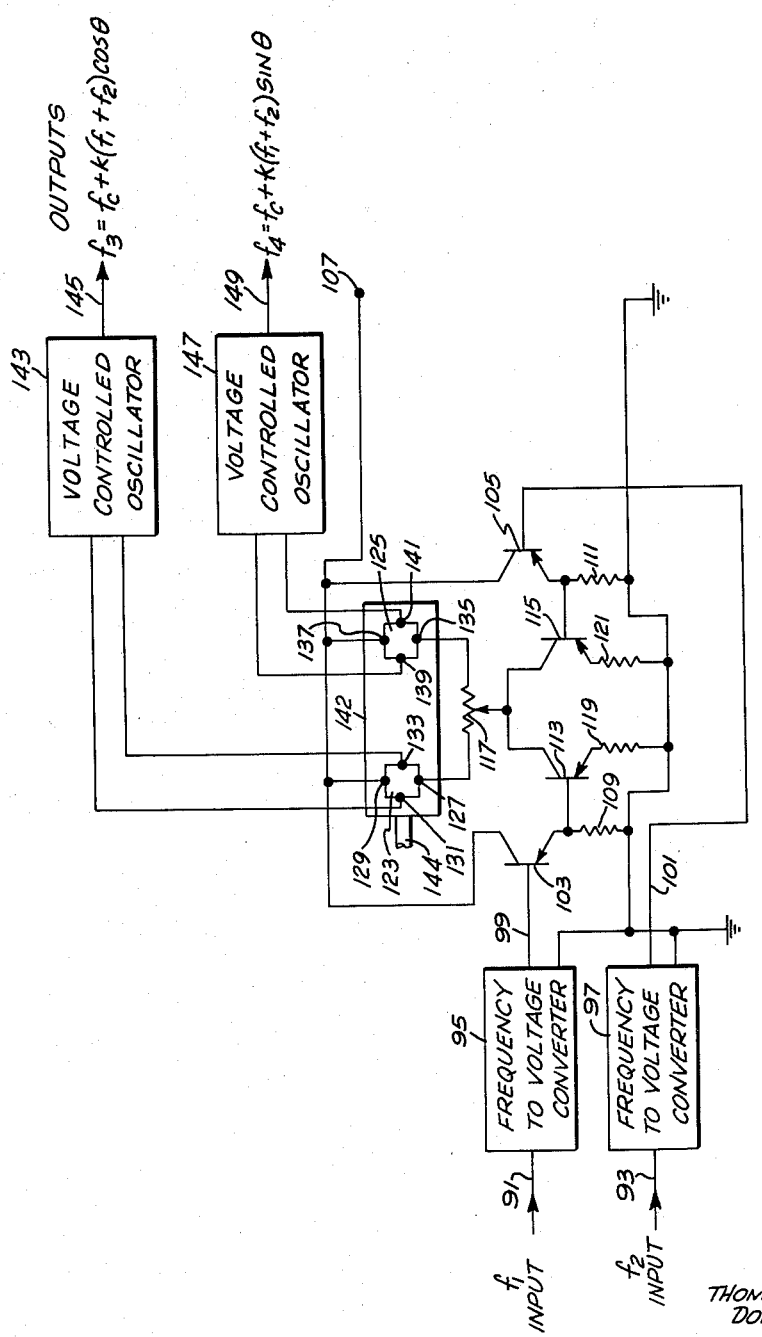

Dec. 31, 1963   D. R. SIMON ET AL   3,116,464
FREQUENCY RESOLVER
Filed Dec. 11, 1961   3 Sheets-Sheet 3

THOMAS W. PARSONS
DONALD R. SIMON
INVENTORS

BY S. A. Giarratana
Francis L. Masselle
ATTORNEYS

United States Patent Office

3,116,464
Patented Dec. 31, 1963

3,116,464
FREQUENCY RESOLVER
Donald R. Simon, Bloomingdale, N.J., and Thomas W. Parsons, Brooklyn, N.Y., assignors to General Precision Inc., Little Falls, N.J., a corporation of Delaware
Filed Dec. 11, 1961, Ser. No. 158,357
2 Claims. (Cl. 331—107)

This invention relates to analog instruments and more particularly to resolvers in which the information is represented in the input and output signals by frequency.

Resolvers are used in analog equipment such as inertial navigation and guidance systems, radar systems and the like to produce a pair of output signals which represent some quantity times the sine of an input angle and this quantity times the cosine of this angle. In these systems, because amplitude of signals represents the information, attenuation of the signals degrades the information and tends to destroy it.

In the system of the present invention this problem is overcome by having the information represented in the input and output signals not by amplitude but by frequency, and thus the information represented by the input and output signals is not subject to degradation by attenuation. Moreover, the frequency resolvers of the present invention will be extremely useful in Doppler radar systems, which operate on frequency sensitive devices.

Briefly, according to the invention, an input frequency is converted into a signal having an amplitude which is proportional to the input frequency. This signal is then applied across a pair of input terminals on each of two semiconductor crystals. The semiconductor crystals are adapted to have magnetic flux applied thereto which varies in magnitude in accordance with an input shaft angle. A pair of output terminals is provided on each of the semiconductor crystals positioned to provide an output signal by means of the Hall effect of the magnetic flux applied to the two semiconductor crystals. The flux applied to the crystals varies as the sine and cosine of the input shaft angle respectively so that the output signals from the two semiconductor crystals have amplitudes which vary in accordance with the input frequency times the sine of the input shaft angle and the input frequency times the cosine of the input shaft angle respectively. The output signals are each applied to the input of a voltage controlled oscillator, which produces a corresponding output frequency. Thus two output signals are provided having frequencies which vary in accordance with the input signal frequency times the sine of the input shaft angle and the input signal frequency times the cosine of the input shaft angle respectively.

Another embodiment of the invention has two inputs which are each applied to a frequency to voltage converter. The outputs of the frequency to voltage converters are added together in a summing circuit to produce an output signal having an amplitude which varies in accordance with the sum of the two input frequencies. This output signal from the summing circuit is then applied across the input terminals of two semiconductor crystals, to which magnetic flux is applied. The magnetic flux applied to the two semiconductor crystals varies in accordance with the sine and cosine of an input shaft angle respectively. Each of the semiconductor crystals has a pair of output terminals, from which signals are produced having amplitudes which vary in accordance with the sum of the input frequencies to the system times the sine of the input shaft angle and the sum of the input frequencies times the cosine of the input shaft angle, respectively. The output signals from the semiconductor crystals are applied to voltage controlled oscillators, which produce output signals having frequencies which vary in accordance with the sum of the input signal frequencies to the system times the sine of the input shaft angle and the sum of the input signal frequencies times the cosine of the input shaft angle, respectively.

Accordingly, a principal object of this invention is to provide an improved resolver.

Another object of this invention is to provide a resolver, the input and output signals of which are not subjected to having the information represented by them degraded by attenuation.

A further object of this invention is to provide a resolver, the input and output signals of which represent information by frequency.

A still further object of this invention is to provide a resolver uniquely suited for use in Doppler radar systems.

Further objects and advantages of the present invention will become readily apparent as the following detailed description of the invention unfolds and when taken in conjunction with the drawings, wherein:

FIG. 2 illustrates the circuit of another embodiment of the invention adapted to resolve the sum of two inputs;

Figure 5:
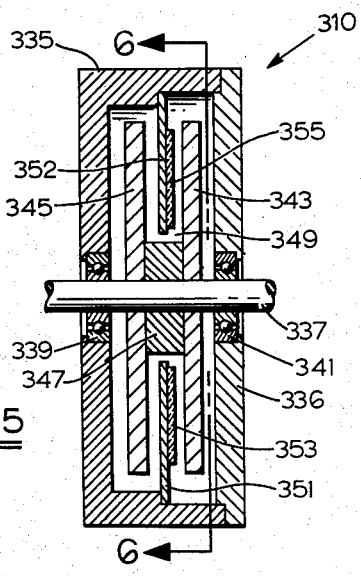
Figure 6:
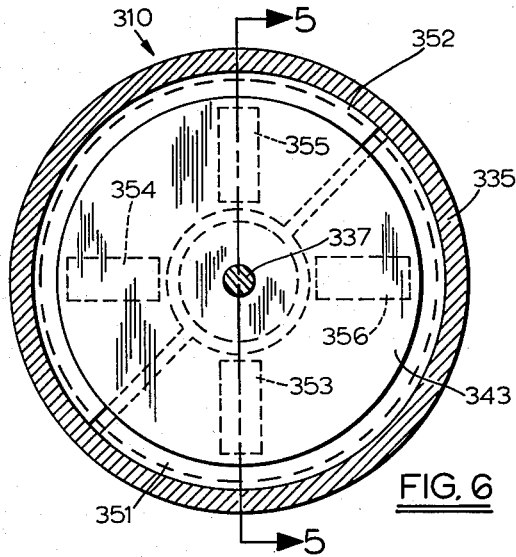
Figure 3:
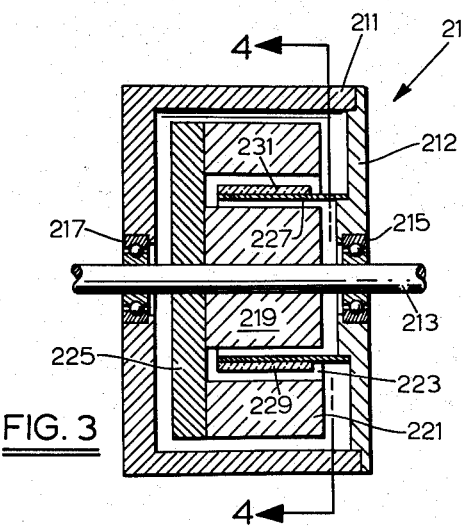
Figure 4:
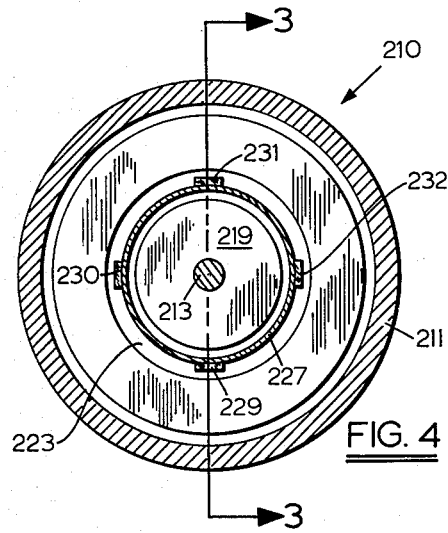

FIGS. 3 and 4 show sectional views of one form of a signal translating instrument utilized in the invention, with the view in FIG. 3 being taken along lines 3—3 in FIG. 4 and the view in FIG. 4 being taken along lines 4—4 in FIG. 3; and FIGS. 5 and 6 show sectional views of another form of signal translating instrument which may be utilized in the invention, with the view in FIG. 5 being taken along lines 5—5 in FIG. 6 and the view in FIG. 6 being taken along lines 6—6 in FIG. 5.

Figure 1:
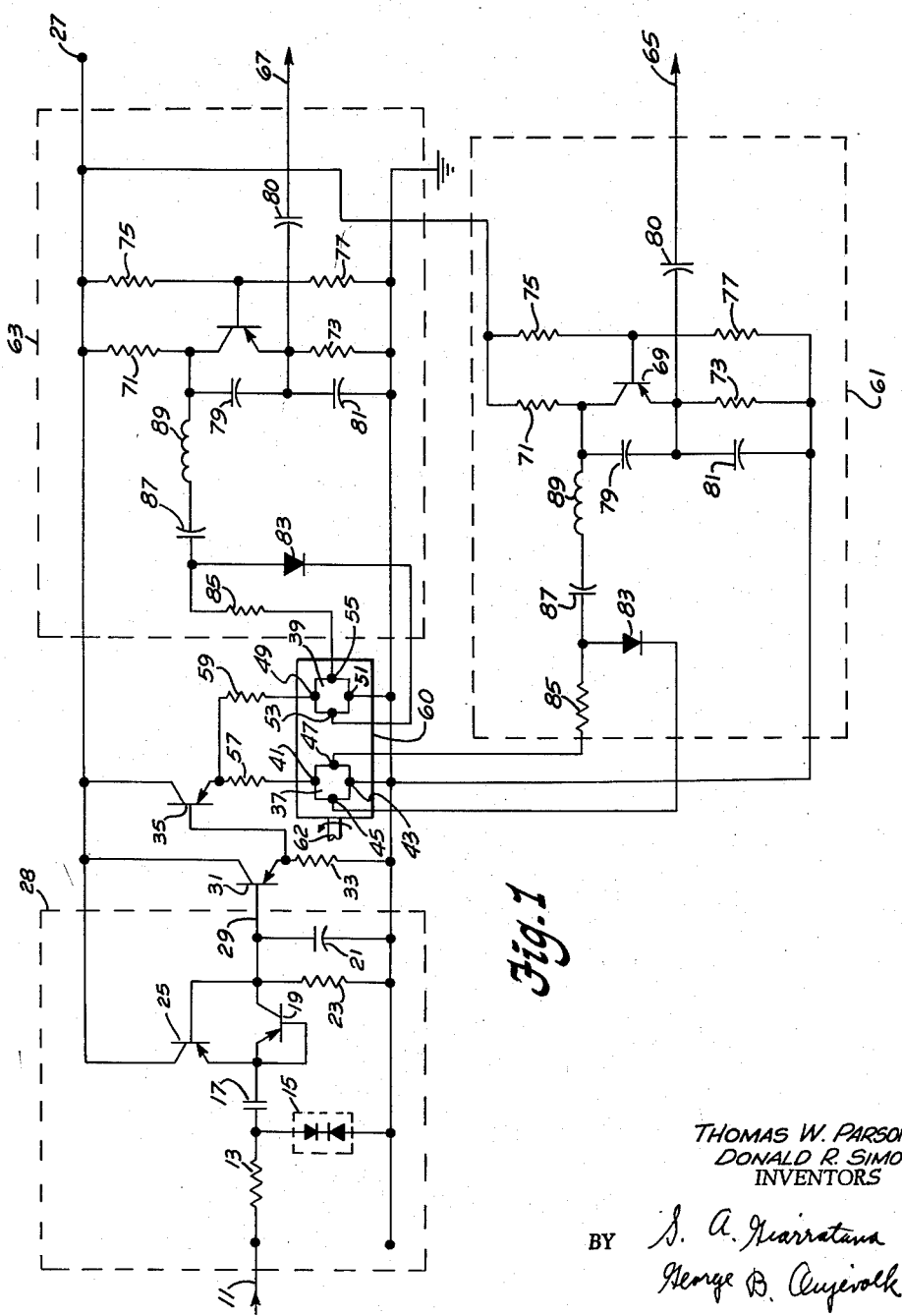
FIG. 1 illustrates the circuit of one embodiment of the invention adapted to resolve a single input.

As shown in FIG. 1, the input signal is applied from an input lead 11 through a 10 kilohm resistor 13 to an amplitude limiter or clipper 15. The amplitude limiter 15 comprises a pair of semiconductor diodes connected in series cathode to cathode between the resistor 13 and ground. The amplitude limiter 15 clips the input signal so that a substantially square wave signal is produced at the junction between the resistor 13 and the amplitude limiter 15. This junction is connected through a 0.001 microfarad capacitor 17 to the commonly connected emitter and base of a PNP transitsor 19. The capacitor 17 differentiates the square wave signal produced at the discriminator 15, and applies the differentiated output to the transistor 19. The differentiated output of the capacitor 17 will comprise a series of alternating positive and negative constant amplitude pulses, the frequency of which corresponds to the input signal frequency on line 11. The collector of the transistor 19 is connected through a 0.01 microfarad capacitor 21 to ground. The capacitor 21 is connected in parallel with the 10 kilohm resistor 23. The transistor 19 functions as a rectifier and passes only the negative going pulses in the output from the capacitor 17 to the capacitor 21, which integrates the rectified output from the transistor 19. Since the output negative going pulses from the transistor 19 applied to the capacitor 21 have the same amplitude, the integrated voltage developed across the capacitor 21 will be proportional to the frequency of these pulses and accordingly the voltage developed across the capacitor 21 will be proportional to the frequency of the signal applied to the input lead 11. The junction between the collector of the transistor 19 and the capacitor 21 is connected to the base of a PNP transistor 25, the emitter of which is connected to the emitter of the transistor 19. The collector of the transistor 25 is connected to a source of supply voltage of −20 volts applied at a terminal 27. The transistor 25 acts as an emitter follower to maintain the average voltage at the input to the rectifier comprising transistor 19 substantially equal to the output voltage developed across the capacitor 21. The transistor 19 is used to provide the desired rectifying action instead of a diode because it is desired to match the temperature characteristics of the circuit element providing the rectifying action with the temperature characteristics of the transistor 25, and this maching is more easily accomplished with two transistors than with a transistor and a diode.

The circuitry comprising the resistor 13, the amplitude limiter 15, the capacitor 17, the transistors 19 and 25, the resistor 23 and the capacitor 21 comprise a frequency to voltage converter 28, which produces an output signal having an amplitude proportional to the frequency of the input signal applied to the lead 11. The output signal voltage of the converter 28 is produced across capacitor 21 and on an output lead 29 connected to the ungrounded side of the capacitor 21. The lead 29 is connected to the base of a PNP transistor 31, which is connected as an emitter follower amplifier by having its collector connected to the −20 volts at terminal 27 and its emitter connected to ground through a 5.1 kilohm resistor 33. The output signal voltage in line 29 is therefore reproduced at the emitter of the transistor 31 with increased power. This signal produced at the emitter of the transistor 31 is applied to the base of a PNP transistor 35.

The resolver of FIG. 1 is provided with a pair of semiconductor crystals 37 and 39, which are each adapted to be Hall generators. To this end the crystal 37 is provided with a pair of input terminals 41 and 43 and a pair of output terminals 45 and 47. Similarly the crystal 39 is provided with a pair of input terminals 49 and 51 and a pair of output terminals 53 and 55. A resistor 57 is connected between the input terminal 41 of the crystal 37 and the emitter of the transistor 35 and the input terminal 43 of the crystal 37 is connected to ground. A resistor 59 is connected between the input terminal 49 of the crystal 39 and the emitter of the transistor 35 and the input terminal 51 of the crystal 39 is connected to ground. Thus the transistor 35 operates as an emitter follower amplifying the power of the signal voltage at the emitter of the transistor 31 and causing current proportional to this signal voltage to flow through the crystals 37 and 39 between the input terminals thereof, which are connected in the emitter load circuit of the transistor 35. The values of the resistors 57 and 59 are adjusted to make the currents flowing through the crystals 37 and 39 equal. The crystals 37 and 39 are adapted to be Hall generators and are part of a translating instrument 60, which applies magnetic flux to the crystals 37 and 39. The translating instrument 60 is provided with an input shaft 62, which controls the magnitude of the flux applied to the crystals 37 and 39. The flux applied to the crystal 37 varies proportionally in accordance with the sine of the input shaft angle and the flux applied to the crystal 39 varies proportionally in accordance with the cosine of the input shaft angle. The output terminals 45 and 47 are positioned at right angles to the input terminals 41 and 43 to produce an output signal voltage therefrom by means of the Hall effect of the flux applied to the crystal 37. Similarly the output terminals 53 and 55 of the crystal 39 are positioned at right angles relative to the input terminals 49 and 51 to produce therefrom a signal voltage by means of the Hall effect of the flux applied to the crystal 39. The output signal voltage produced from terminals 45 and 47 will be proportional to the flux applied to the crystal 37 and also proportional to the current flowing between the input terminals 41 and 43 through the crystal 37. The input current flowing between the input terminals 41 and 43 as well as the input current flowing between the input terminals 49 and 51 of the crystal 39 will be proportional to the output signal from the frequency to voltage converter 28 produced on output lead 29 and therefore will be proportional to the frequency of the input signal applied on input lead 11. Thus the crystal 37 will produce from its output terminals 45 and 47 a signal voltage proportional to the input frequency times the sine of the angle of the shaft 62. Similarly the crystal 39 will produce from its output terminals 53 and 55 a signal voltage proportional to the frequency of the input signal applied to input lead 11 times the cosine of the input shaft angle. A device which can be used for the translating instrument 60 is described in the copending application Serial No. 138,339 filed September 15, 1961 entitled Translating Instrument, invented by Thomas W. Parsons, and assigned to the assignee of the present invention. The forms of translating instruments disclosed in copending application Serial No. 138,339 are hereinafter described in detail.

The output voltage from the crystal 37 developed across terminals 45 and 47 is applied to the input of a voltage controlled oscillator 61. The output signal voltage developed across terminals 53 and 55 of the crystal 39 is applied to the input of a voltage controlled oscillator 63. The voltage controlled oscillators 61 and 63 will each produce an output signal frequency which varies linearly in accordance with the voltage applied to the input thereof. Each of the oscillators 61 and 63 is designed to produce an output signal frequency of 1.5 megacycles per second with zero signal voltage applied thereto. Thus the output signal frequency produced on the output lead 65 of the oscillator 61 will be equal to 1.5 megacycles per second plus an amount proportional to the input signal frequency applied on input lead 11 times the sine of the input shaft angle. Similarly the output signal frequency produced on the output lead 67 of the oscillator 63 will be equal to 1.5 megacycles per second plus an amount proportional to the input signal frequency applied on line 11 times the cosine of the input shaft angle. The output signal frequencies produced on lines 65 and 67 can be represented by the following expressions:

$$f_{65} = 1.5 \text{ mc./s.} + kf_{in} \sine \theta$$
$$f_{67} = 1.5 \text{ mc./s.} + kf_{in} \cos \theta$$

in which $f_{65}$ is the frequency of the signal produced on output lead 65, $f_{67}$ is the frequency produced on output lead 67, $k$ is a constant determined by the circuit parameters, $f_{in}$ is the frequency of the input signal applied on lead 11 and $\theta$ is the input angle of the shaft 62.

The oscillator 61 comprises a PNP transistor 69, the collector of which is connetced to the −20 volts at terminal 27 by a 100 kilohm resistor 71. The emitter of the transistor 69 is connected to ground through a 10 kilohm resistor 73. The base of the transistor 69 is biased by means of a voltage divider circuit comprising a 12 kilohm resistor 75 connected between the base of the transistor 69 and the −20 volts at terminal 27 and a one kilohm resistor 77 connected between the base of the transistor 69 and ground. Two .001 microfarad capacitors 79 and 81 are connected in series between the collector of the transistor 69 and ground. The junction between the capacitors 79 and 81 is connected to the emitter of the transistor 69. The transistor oscillator circuit 61 is also provided with a semiconductor diode 83 which is operated as a variable capacitor. The cathode of the diode 83 is connected to the output terminal 45 of the crystal 37 and the anode of the diode 83 is connected to the output terminal 47 of the crystal 37 by means of a 100 kilohm resistor 85. The junction between the resistor 85 and the diode 83 is connected to the collector of the transistor 69 by means of a series circuit of a .01 microfarad capacitor 87 and a one millihenry inductor 89. The output voltage produced by the crystal 37 from the terminals 45 and 47 is applied across the diode 83 through the resistor 85. As a result the capacitance across the diode 83 will vary linearly with the output voltage produced across the terminals 45 and 47 of the crystal 37. The capacitor 87, the inductor 89 and the capacitance provided by the diode 83 are connected in series between the collector of the transistor 69 and ground through the crystal 37. As a result a resonant tank circuit comprising the capacitor 87, the inductor 89 and the capacitance of the diode 83 in one branch and the capacitors 79 and 81 in the other branch is connected between the collector of the transistor 69 and ground. A regenerative feedback from this tank circuit to the transistor 69 is provided by the connection from between the capacitors 79 and 81 to the emitter of the transistor 69. Since the capacitance provided by the diode 83 forms part of the resonant tank circuit, the frequency of oscillation will depend upon this capacitance and in fact will vary linearly with this capacitance. Thus the oscillation frequency of the oscillator 61 varies linearly in accordance with the input signal voltage applied across the diode 83 through the resistor 85. The signal generated by the oscillator 61 is applied to output lead 65 through a 0.001 microfarad capacitor 80.

The oscillator 63 is identical to the oscillator 61 and accordingly will not be described in detail. The components of the oscillator 63 have been given the same reference numbers as the components of the oscillator 61 in view of its being identical to the oscillator 61.

In the embodiment of the invention shown in FIG. 2, there are two input lines 91 and 93, upon which two input signal frequencies can be severally applied. The input lead 91 is connected to the input of a frequency to voltage converter 95 and the input lead 93 is connected to the input of a frequency to voltage converter 97. The frequency to voltage converters 95 and 97 comprise circuits identical to that of the frequency to voltage converter 28 shown in FIG. 1. The frequency to voltage converter 95 produces a signal voltage on its output lead 99 proportional to the frequency of a signal applied to the input lead 91 and the frequency to voltage converter 97 produces a signal voltage on its output lead 101 proportional to the frequency of the signal applied to the input lead 93. The signal voltage on lead 99 is applied to the base of a PNP transistor 103 and the signal voltage on the lead 101 is applied to the base of a PNP transistor 105. The transistors 103 and 105 are connected as emitter followers by having their collectors connected to a source of −28 volts applied at a terminal 107 and by having their emitters connected to ground through 6.8 kilohm resistors 109 and 111 respectively. Thus the signal voltage on line 99 will be produced at the emitter of the transistor 103 with increased power and the signal voltage on lead 101 will be produced with increased power at the emitter of the transistor 105. The emitter of the transistor 103 is connected to the base of a PNP transistor 113 and the emitter of the transistor 105 is connected to the base of a PNP transistor 115. The collectors of the transistors 113 and 115 are connected together and to the movable tap of a potentiometer 117. The emitters of the transistors 113 and 115 are connected to ground through 470 ohm resistors 119 and 121 respectively.

The resolver of FIG. 2 is provided with semiconductor crystals 123 and 125, which are adapted to be Hall generators. To this end the crystal 123 is provided with input terminals 127 and 129 and output terminals 131 and 133 positioned at right angles with respect to terminals 127 and 129, and the crystal 125 is provided with input terminals 135 and 137 and output terminals 139 and 141 positioned at right angles to the input terminals 135 and 137. One end terminal of the potentiometer 117 is connected to the input terminal 127 of the crystal 123 and the other end terminal of the potentometer 117 is connected to the input terminal 135 of the crystal 125. The other input terminal 129 of the crystal 123 and the other input terminal 137 of the crystal 125 are connected to the source of −28 volts applied at terminal 107. The transistors 113 and 115 amplify the signal voltages applied to their bases from the emitters of the transistors 103 and 105 respectively and the resulting collector currents of these transistors are combined in the movable tap of the potentiometer 117. As a result the current flowing through the movable tap of the potentiometer 117 will be proportional to the sum of the signal voltages applied at the bases of transistors 113 and 115 and the currents flowing through the crystals 123 and 125 between the input terminals thereof will be proportional to this sum. The position of the movable tap of the potentiometer 117 is adjusted so that the currents flowing through the crystals 123 and 125 are equal. Thus equal currents will be produced flowing through the crystals 123 and 125 proportional to the sum of the input signal frequencies applied on leads 91 and 93. The crystals 123 and 125 are part of a translating instrument 142, which is identical to the translating instrument 60 of FIG. 1. The translating instrument 142 has an input shaft 144 which controls the amount of flux applied to the crystals 123 and 125. The flux applied to the crystal 123 varies as the cosine of the input shaft angle and the flux applied to the crystal 125 varies as the sine of the input shaft angle. A voltage will be generated from the output terminals 131 and 133 of the crystal 123 proportional to the flux applied thereto and to the current flowing between the input terminals 127 and 129. Likewise the crystal 125 will produce an output voltage from terminals 139 and 141 proportional to flux applied thereto and to the current flowing between input terminals 137 and 135. Thus the crystal 123 will produce a voltage from output terminals 131 and 133 proportional to the product of the sum of the input frequencies times the cosine of the input shaft angle and the crystal 125 will produce from its output terminals 139 and 141 a signal voltage proportional to the sum of the input frequencies times the sine of the input shaft angle. The output signal voltage produced from terminals 131 and 133 of the crystal 123 is applied to the input of a voltage controlled oscillator 143 which in response thereto will produce an output signal frequency on lead 145 which varies linearly with the applied input signal voltage. The voltage produced from the output terminals 139 and 141 from the crystal 125 is applied to the input voltage controlled oscillator 147, which in response thereto produces an output signal frequency on line 149 which varies linearly in accordance with the applied input signal voltage. The oscillators 143 and 147 comprise circuits identical ot those of the oscillators 61 and 63 shown in FIG. 1. Thus each of the oscillators 143 and 147 will produce an output signal having a frequency of 1.5 megacycles per second with no input signal voltage applied thereto. The oscillator 143 will generate an output signal having a frequency of 1.5 megacycles per second plus an amount proportional to the sum of the input frequencies times the cosine of the input shaft angle and the oscillator 147 will produce an output signal having a frequency of 1.5 megacycles per second plus an amount proportional to the sum of the input frequencies times the sine of the input shaft angle. The output signal frequencies can be represented by the following expressions:

$$f_{145} = 1.5 \text{ mc./s.} + k(f_{91} + f_{93}) \cos \theta$$
$$f_{149} = 1.5 \text{ mc./s.} + k(f_{91} + f_{93}) \sin \theta$$

in which $f_{145}$ is the frequency of the output signal on lead

145, $f_{149}$ is the frequency of the output signal on lead 149, $k$ is a constant depending upon circuit parameters, $f_{91}$ is the input frequency on lead 91, $f_{93}$ is the input frequency on lead 93, and $\theta$ is the input angle of the shaft 144.

The above described frequency resolvers, because they produce and operate in response to signals in which the information is represented by frequency thus make possible improved systems in which the information is not subject to degradation by attention and moreover are uniquely suited for use in Doppler radar systems, which operate on frequency sensitive devices.

As previously mentioned, translating instruments 60 and 142 may take the form of those disclosed in the aforementioned copending application Serial No. 138,339. One such instrument, designated generally as 210, is shown in FIGS. 4 and 5 and comprises a cylindrical casing 211 having an end plate 212. On the axis of casing 211, a shaft 213 is rotatably mounted by means of bearings 215 and 217. Mounted coaxially on the shaft 213 for rotation therewith is a rotor 219, which comprises a permanent manget having its poles on diametrically opposite sides of shaft 213. Surrounding rotor 219 is an annular member 221 positioned coaxially about shaft 213. Annular member 221 is radially spaced from rotor 219 leaving an annular air gap 223 defined therebetween coaxial with the rotor.

Rotor 219 and annular member 221 are joined by a disc 225 which is also mounted coaxially on shaft 213. Thus the assembly made up of rotor 219, annular member 221 and disc 225 is adapted to be rotated by shaft 213.

Annular member 221 comprises soft iron and constitutes a low reluctance return path for the permanent magnet of rotor 219. A tubular support 227 is mounted on end plate 212 of casing 211, coaxially with shaft 213, and extends into annular air gap 223. Tubular support 227 is made of a non-magnetic, non-conducting substance, such as glass. Mounted on tubular support 227 in air gap 223 are four Hall effect plates 229, 230, 231, 232 spaced about the axis of shaft 213 at 90° intervals. The Hall plates are in the form of crystals bonded to tubular support 227 and may be formed by vapor plating semiconductor layers on the tubular support. From the structure described it will be seen that the assembly of the rotor 219 and annular member 221 can rotate freely with respect to Hall plates 229–232 and tubular support 227.

With this construction, the permanent magnet of rotor 219 provides a strong magnetic field because it must traverse only a narrow air gap between rotor 219 and annular member 221. Since annular member 221 rotates with rotor 219, the strength of the magnetic field in the return path provided by annular member 221 will always be the same and thus no hysteresis effect will result. As rotor 219 revolves, the magnitude of the field through Hall plates 229–232 will vary, thus causing the output signals therefrom to vary with the angular position of input shaft 213. The magnetic field is shaped in such a manner that the flux density in any given position in air gap 223 varies sinusoidally with the angular position of the magnetic field and, therefore, the angular position of input shaft 213. Since the direction of flux through air gap 223 will always be normal to the planes of Hall plates 229–232, the output signals from the Hall plates will vary sinusoidally with the angular position of the input shaft 213.

The desired shaping of the magnetic field is achieved by machining annular member 221. If the angular position of shaft 213 is taken as 0 when the strength of the field is a minimum through the diametrically opposed Hall plates 229 and 231, then the output signal from these Hall plates will be proportional to the sine of the angular position of shaft 213 and the output signal from Hall effect plates 230 and 232, 90° removed from plates 229 and 231, will be proportional to the cosine of the angular position of shaft 213.

Another form of translating instrument, designated 310, is shown in FIGS. 5 and 6 and comprises a cylindrical casing 335 having an end plate 336. A shaft 337 is rotatably mounted on the axis of casing 335 by means of bearings 339 and 341. A disc-shaped rotor 343 is mounted coaxially on shaft 337 for rotation therewith. Rotor 343 comprises a permanent magnet having its pole on diametrically opposite sides of shaft 337. A second disc-shaped member 345 is also coaxially mounted on shaft 337 for rotation therewith axially spaced from rotor 343 by means of a spacer 347, leaving a washer-shaped air gap 349 between rotor 343 and disc-shaped member 345. Thus the assembly made up of rotor 343, disc-shaped member 345 and spacer 347 is adapted to be rotated by input shaft 337.

Supports 351 and 352, each shaped like a half-washer, are fixed to the cylindrical walls of casing 335 and extend into air gap 349 surrounding spacer 347. Four Hall plates 353, 354, 355, 356 are mounted on supports 351 and 352 in air gap 349 at 90° intervals about shaft 337. The material of disc-shaped members 345 is soft iron and it thus provides a low reluctance return path for permanent magnet 343. Air gap 349 is coaxial with the axis of the assembly of rotor 343 and member 345 so that this assembly may be freely rotatable with respect to the Hall plates 353–356 and supports 351 and 352.

Because the magnetic field provided by permanent magnet of rotor 343 needs to pass through only a small air gap (349) between disc-shaped member 345 and rotor 343, the field strength will be great; because the low reluctance return path provided by member 345 turns with rotor 343, the magnetic field through the return path 345 will be constant and, therefore, there will be no hysteresis effect. As shaft 337 rotates, the strength of the field through Hall effect plates 353–356 will vary and thus the output signal from each of the Hall plates will vary in accordance with the angular position of input shaft 337.

Disc-shaped member 343 is machined to shape the magnetic field in such a way that the flux density in any one position in gap 349 will vary sinusoidally with the angular position of the magnetic field and therefore of input shaft 337. Since the direction of the flux passing through air gap 349 is always perpendicular to the plane of Hall plates 353–356, the output signals from the Hall plates will vary sinusoidally with the angular position of input shaft 337. Taking as zero the input shaft position at which the field strength through the diametrically opposed Hall plates 353 and 355 is a minimum, the output signal from these plates will be proportional to the sine of the angle of input shaft 337, while the output signal from Hall plates 354 and 356, displaced 90° from plates 353, 355, will be proportional to the cosine of the angular position of the shaft.

In both forms of translating instruments, the roles of the members providing the permanent magnet and the low reluctance return path can be reversed, e.g., in the FIG. 3–4 embodiment, the permanent magnet can be embodied in the annular member 21 with rotor 19 providing the low reluctance return path.

Many modifications may be made to the above described embodiments of the invention without departing from the spirit and scope thereof.

What is claimed is:

1. A transducer comprising a semiconductor crystal, a pair of input terminals on said crystal, means to apply a variable flux to said crystal, means to cause current to flow through said crystal between said input terminals, a pair of output terminals positioned on said crystal to produce an output signal voltage by means of the Hall effect of the flux applied to said crystal, a resistor and a semiconductor diode connected in series across said output terminals, a resonant tank circuit including said diode and a reactive circuit connected between the junction of said diode and said resistor and one of said input terminals, and an oscillator including said tank circuit adapted to oscillate at a frequency determined by said tank circuit.

2. A device as claimed in claim 4, said semiconductor crystal being part of a translating instrument which applies magnetic flux to said crystal, said translating instrument including an input shaft which controls the magnitude of the flux applied to the crystal, the flux applied to the crystal varying proportionally in accordance with a fuction of the input shaft angle.

References Cited in the file of this patent

UNITED STATES PATENTS

| | | |
|---|---|---|
| 2,980,332 | Brouillette et al. | Apr. 18, 1961 |
| 2,988,707 | Kuhrt et al. | June 13, 1961 |
| 3,028,092 | Fay | Apr. 3, 1962 |